US007756881B2

(12) United States Patent
Crivat et al.

(10) Patent No.: US 7,756,881 B2
(45) Date of Patent: Jul. 13, 2010

(54) PARTITIONING OF DATA MINING TRAINING SET

(75) Inventors: Ioan Bogdan Crivat, Redmond, WA (US); Raman S. Iyer, Redmond, WA (US); C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 11/371,477

(22) Filed: Mar. 9, 2006

(65) Prior Publication Data

US 2007/0214135 A1 Sep. 13, 2007

(51) Int. Cl.
G06F 7/00 (2006.01)
G06F 17/30 (2006.01)
(52) U.S. Cl. ........................ 707/754; 707/776
(58) Field of Classification Search ............ 707/6, 707/754, 776; 706/15
See application file for complete search history.

(56) References Cited

U.S. PATENT DOCUMENTS

| 5,432,818 | A | 7/1995 | Lou |
| 5,761,442 | A * | 6/1998 | Barr et al. ............. 705/36 R |
| 6,496,814 | B1 | 12/2002 | Busche |
| 6,513,025 | B1 * | 1/2003 | Rosen ................... 706/45 |
| 6,563,952 | B1 | 5/2003 | Srivastava et al. |
| 6,799,181 | B2 | 9/2004 | Vishnubhotla |
| 6,937,966 | B1 * | 8/2005 | Hellerstein et al. ........ 703/2 |
| 6,970,882 | B2 * | 11/2005 | Yao et al. ............... 707/102 |
| 7,349,919 | B2 * | 3/2008 | Russell et al. .......... 707/102 |
| 7,373,332 | B2 * | 5/2008 | Heumann et al. ........ 706/16 |
| 2002/0059202 | A1 * | 5/2002 | Hadzikadic et al. ........ 707/3 |
| 2002/0083066 | A1 | 6/2002 | Lee et al. |
| 2003/0088565 | A1 * | 5/2003 | Walter et al. ............. 707/6 |
| 2003/0195889 | A1 * | 10/2003 | Yao et al. ............... 707/100 |
| 2003/0212678 | A1 * | 11/2003 | Bloom et al. ............. 707/6 |
| 2003/0212851 | A1 * | 11/2003 | Drescher et al. ......... 711/100 |
| 2004/0098390 | A1 * | 5/2004 | Bayliss et al. ............ 707/7 |
| 2004/0249867 | A1 * | 12/2004 | Kraiss et al. ........... 707/203 |
| 2004/0260677 | A1 * | 12/2004 | Malpani et al. ........... 707/3 |
| 2005/0021489 | A1 * | 1/2005 | MacLennan et al. ....... 707/1 |
| 2005/0027683 | A1 | 2/2005 | Dill et al. |

(Continued)

OTHER PUBLICATIONS

Manish Mehta, Rakesh Agrawal and Jorma Rissanen, SLIQ: A Fast Scalable Classifier for Data Mining, Mar. 1996.*

(Continued)

*Primary Examiner*—James Trujillo
*Assistant Examiner*—Jeffrey Burke
(74) *Attorney, Agent, or Firm*—Workman Nydegger

(57) ABSTRACT

A system that effectuates fetching a complete set of relational data into a mining services server and subsequently defining desired partitions upon the fetched data is provided. In accordance with the innovation, the data can be locally cached and partitioned therefrom. Accordingly, upon the same mining structure (e.g., cache) that has been partitioned, the novel innovation can build mining models for each partition. In other words, the innovation can employ the concept of mining structure as a data cache while manipulating only partitions of this cache in certain operations. The innovation can be employed in scenarios where a user wants to train a mining model using only data points that satisfy a particular Boolean condition, a user wants to split the training set into multiple partitions (e.g., training/testing) and/or a user wants to perform a data mining procedure known as "N-fold cross validation."

6 Claims, 8 Drawing Sheets

U.S. PATENT DOCUMENTS

| | | |
|---|---|---|
| 2005/0149459 A1 | 7/2005 | Kofman et al. |
| 2006/0010110 A1* | 1/2006 | Kim et al. ............... 707/3 |
| 2006/0020620 A1* | 1/2006 | Iyer et al. ............... 707/102 |
| 2006/0161403 A1* | 7/2006 | Jiang et al. ............... 703/2 |
| 2007/0174290 A1* | 7/2007 | Narang et al. ............... 707/10 |

OTHER PUBLICATIONS

Hendrik Blockeel and Jan Struyf, Efficient Alogrithms for Decision Tree Cross-Validation, Dec. 2002.*

Slobodan Vucetic, Time Fiex, and Zoran Obradovic, A Data Partitioning Scheme for Spatial Regression, publsihed 1999, IEEE University Research Consortium, p. 2474-2479.*

Jensen, D., et al.; "Data Mining in Social Networks," (14 pages).

Kwak, C., et al.; "Data-Mining Approach to Production Control in the Computer-Integrated Testing Cell," IEEE Transactions on Robotics and Automation, vol. 20, No. 1, Feb. 2004; (10 pages).

Last, M., et al; "Knowledge Discovery in Time Series Databases," IEEE Transactions on Systems, Man, and Cybernetics—Part B: Cybernetics, vol. 31, No. 1, Feb. 2001; (10 pages).

* cited by examiner

PARTITIONING OF DATA MINING TRAINING SET

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. For instance, due to ever-increasing processor and memory capabilities, if data is entered properly into an application/wizard, such application/wizard can automatically output a response nearly instantaneously (in comparison to hours or days generating such response by hand previously required).

Furthermore, through utilization of computers and computer-related devices, vast magnitudes of data can be obtained for analysis and predictive purposes. For example, a retail sales establishment can employ a data analysis application to track sales of a particular good given a particular type of customer, income level of customers, a time of year, advertising strategy, and the like. More particularly, patterns within collected data can be determined and analyzed, and predictions relating to future events can be generated based upon these patterns. While the above example describes utilizing data in connection with retail sales, it is understood that various applications and contexts can benefit from analysis of accumulated data.

The aforementioned analysis of data, recognition of patterns, and generation of predictions based at least in part upon the recognized patterns can be collectively referred to as data mining. Conventionally, to enable suitable data mining, various models must be programmed and trained by way of training data. For instance, data previously collected can be employed as training data for one or more data mining models. The data mining models can employ various decision tree structures to assist in generating predictions, and can further utilize suitable clustering algorithms to cluster data analyzed by the data mining models. Accordingly, these data mining models can be extremely complex and require significant programming from an expert computer programmer.

Due to complexity of data mining models and extensiveness of computations utilized in connection with such data mining models, there currently exist various deficiencies associated therewith. For example, once data mining models are created and applied to a particular context, it can be extremely difficult to alter such data mining models. In particular, disparate data mining models can be created to generate predictions relating to particular contexts and/or applications, where at the time of creation of such data mining models it was believed that the models were not substantially related. Over time, however, it can be determined that, in fact, the disparate models are substantially related, and therefore it is desirable to utilize an output of one model as an input for a second model (e.g., data output from one data mining model can be utilized as input data and/or training data for a second data mining model). Utilizing conventional systems and/or methodologies, enabling an output of one data mining model to be employed as an input to a second data mining model requires significant custom programming as well as a substantial amount of time.

Another deficiency associated with data mining applications is that data mining models often need a significant amount of training data to operate properly. For instance, a new customer at a retail sales establishment will not be associated with data relating to such establishment. Therefore, data mining applications have difficulty in providing predictions or other relevant information to assist the customer or the retail establishment in recommending items. Therefore, developers of the data mining applications/models must write extensive code for special instances where no data is associated with a subject of a data mining model. An alternative conventional approach is to generate a static rule for all cases where insufficient training data exists—for instance, an individual may be utilizing a web-based retail establishment for a first time. Often, such establishments utilize virtual "shopping baskets" and recommend items to be placed within the basket by way of data mining model(s). A static rule can dictate that no recommendations are to be provided to customers who have not previously viewed and/or purchased items. Such rules, however, are inflexible despite user context and global statistics.

Conventional data mining models and/or applications are also quite expensive in terms of network usage as well as processing power usage with respect to clients utilizing a data mining application resident upon a server. For example, training a data mining model occurs on a server, where particular patterns are recognized. Predictions are generated by mapping input data with respect to existent recognized patterns, which are typically housed upon a server. Clients generally wish to review visualizations of patterns to determine results of the training. However, conventional systems query during the processing and detection of patterns. Afterwards, the data is discarded Conventionally, this visualization can only occur by delivering an entirety of mining model content (e.g., pattern content) from the server to the client. The client can then analyze such content and generate a graphical display of results of the analysis. This retrieval and analysis of data is expensive, as client computers typically are not associated with processing power and memory of servers. Furthermore, networks can be subject to substantial traffic when a significant amount of data is retrieved from a server.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can effectuate fetching a complete set of relational data into a mining services server and subsequently defining desired partitions upon the fetched data. For example, the data can be locally cached and partitioned therefrom. Accordingly, upon the same mining structure (e.g., cache) that has been partitioned, the novel innovation can facilitate building mining models for each partition.

The innovation can employ the concept of a mining structure as a data cache while manipulating only partitions of this cache in certain operations as desired. By way of example, the innovation can facilitate splitting the data into train/test sets and effectuating N-fold cross validation. In accordance with the novel partitioning schemes, the innovation can facilitate utilizing only a portion of the cached data in training data models.

In another aspect, the innovation can unify the case set and attribute set at the mining structure level. Accordingly, the innovation can enable providing per-model views of the attribute set (e.g., only certain columns) and case set (e.g., only certain rows). Partitioning logic can be implemented within the structure.

In accordance with an N-fold cross validation aspect, the innovation can provide for the creation of N independent clone models, each based on a different data partition, inside the same structure. In accordance therewith, the innovation can use the current parallel model processing architecture while relying on the current coordinator. Once all models are complete, the system can score the models and select the best model and rename it as the original model.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
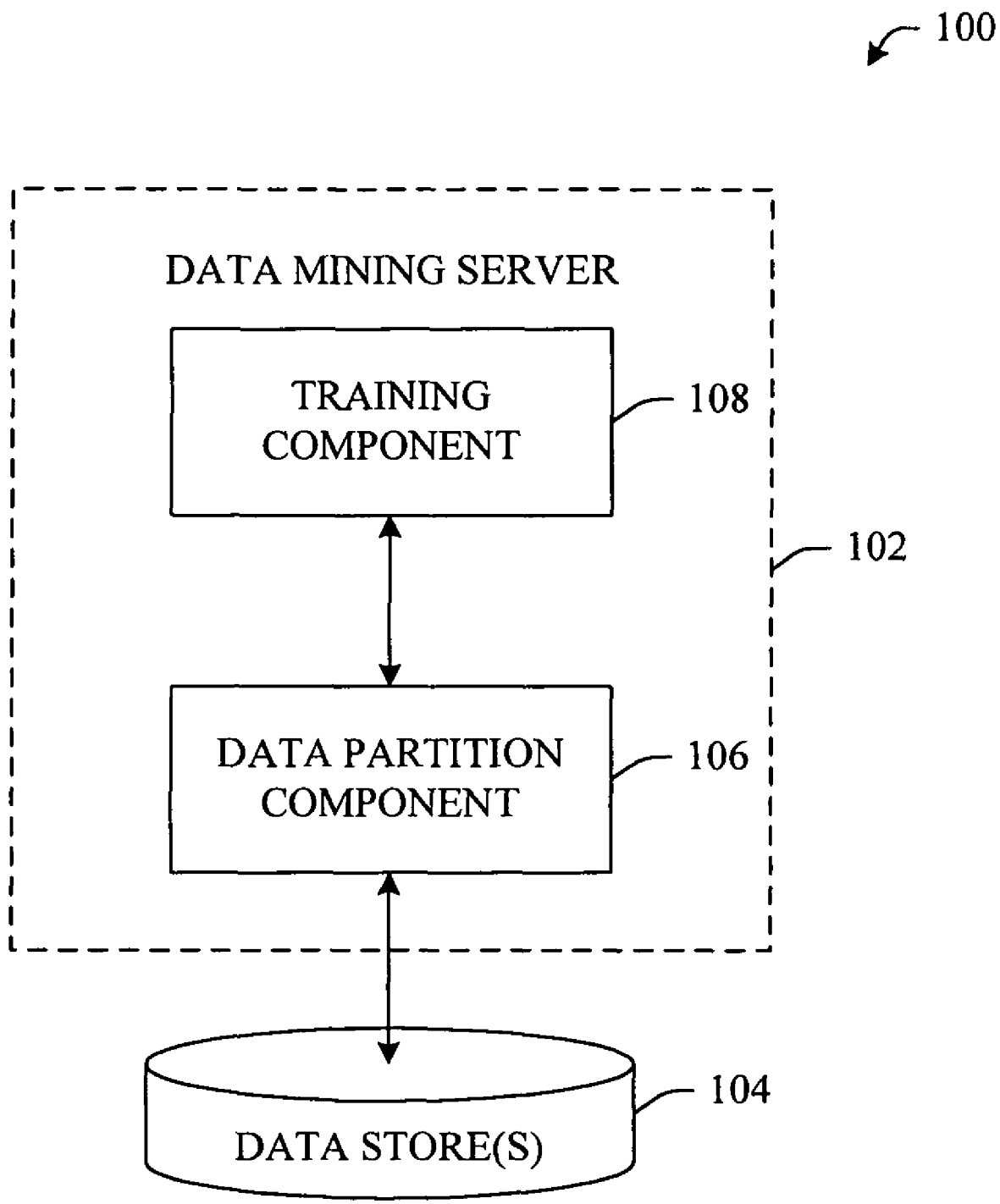
FIG. 1 illustrates a data mining server that facilitates partitioning data in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates partitioning a data mining set in accordance with an aspect of the innovation. Generally, the system 100 can include a data mining server 102 and a data store 104. More particularly, the data mining server 102 can include a data partition component 106 and a training component 108. Each of these components will be described in greater detail with reference to the figures that follow.

The novel system 100, in one aspect thereof, is directed to a system that can build data mining models on top of relational data (e.g., data store 104). As will be understood, a relational database refers to a specific database organization method which links files together as required. Although the examples described herein are primarily described with reference to relational data, it is to be understood that the other aspects exist that are employed in connection with other data organization schemes (e.g., hierarchical, network). These alternative aspects are to be considered a part of this disclosure and claims appended hereto.

Figure 2:
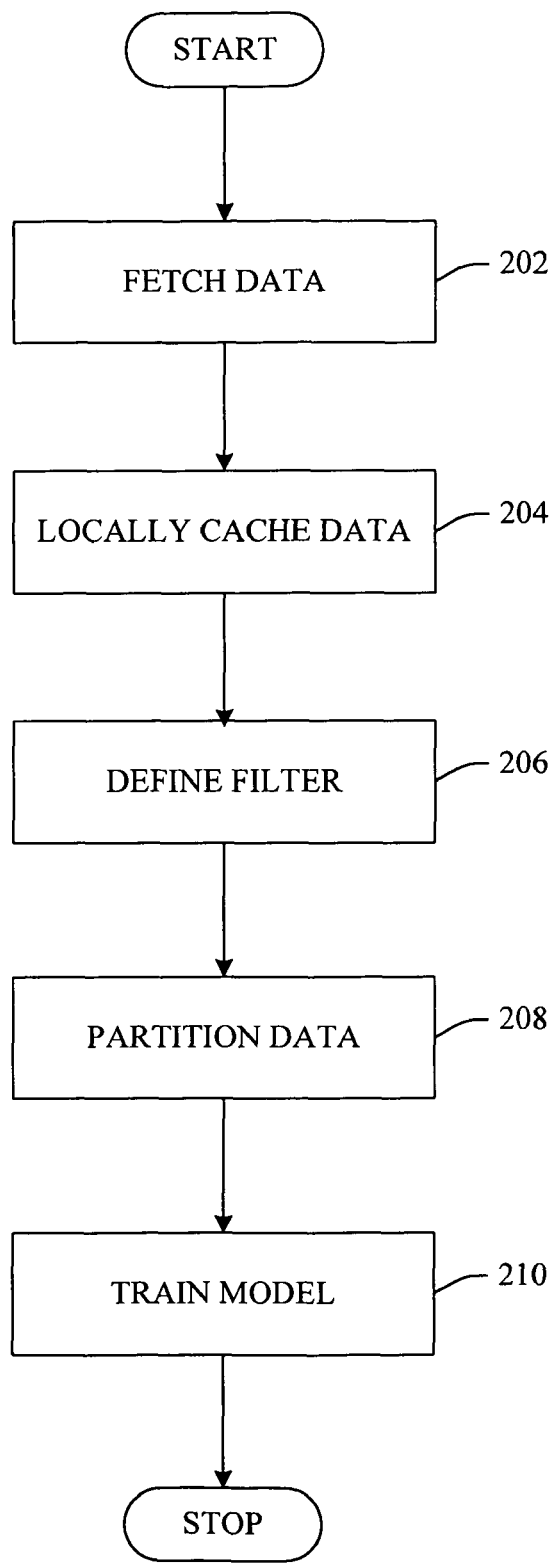
FIG. 2 illustrates an exemplary flow chart of procedures that facilitate locally partitioning cached data in accordance with an aspect of the innovation.

FIG. 2 illustrates a methodology of partitioning data in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202 and in one aspect, data is fetched from a relational data store and, at 204, can be cached locally. It will be understood that this cached data can include all or a subset of the data included within a particular database or store. As well, it is to be understood that any method of caching and/or maintaining the data can be employed in accordance with alternative aspects of the innovation.

Next, at 206 a particular filter can be defined by which the cached data can be partitioned. By way of example, a Boolean operator can be employed to filter a particular range of integer values. In another example, a user can partition the cached data based upon a percentage or number of records. Still other aspects enable a user to employ user defined functions (UDFs) in order to query the data. Without regard to the particular filtering mechanisms, it is to be understood that the user can employ any filtering mechanism or combination of filtering mechanisms to query the data. As such, the data can be partitioned at 208 in accordance with the filtering mechanism(s) chosen.

Once the data is partitioned, at 210, a data mining model can be trained. Similarly, in an aspect, the remaining portion of the cached data can be employed to validate the model. Other variations of partitioning and validating will be described in connection with figures that follow. These alternative aspects are to be included within the scope of the innovation and claims appended hereto.

Figure 3:
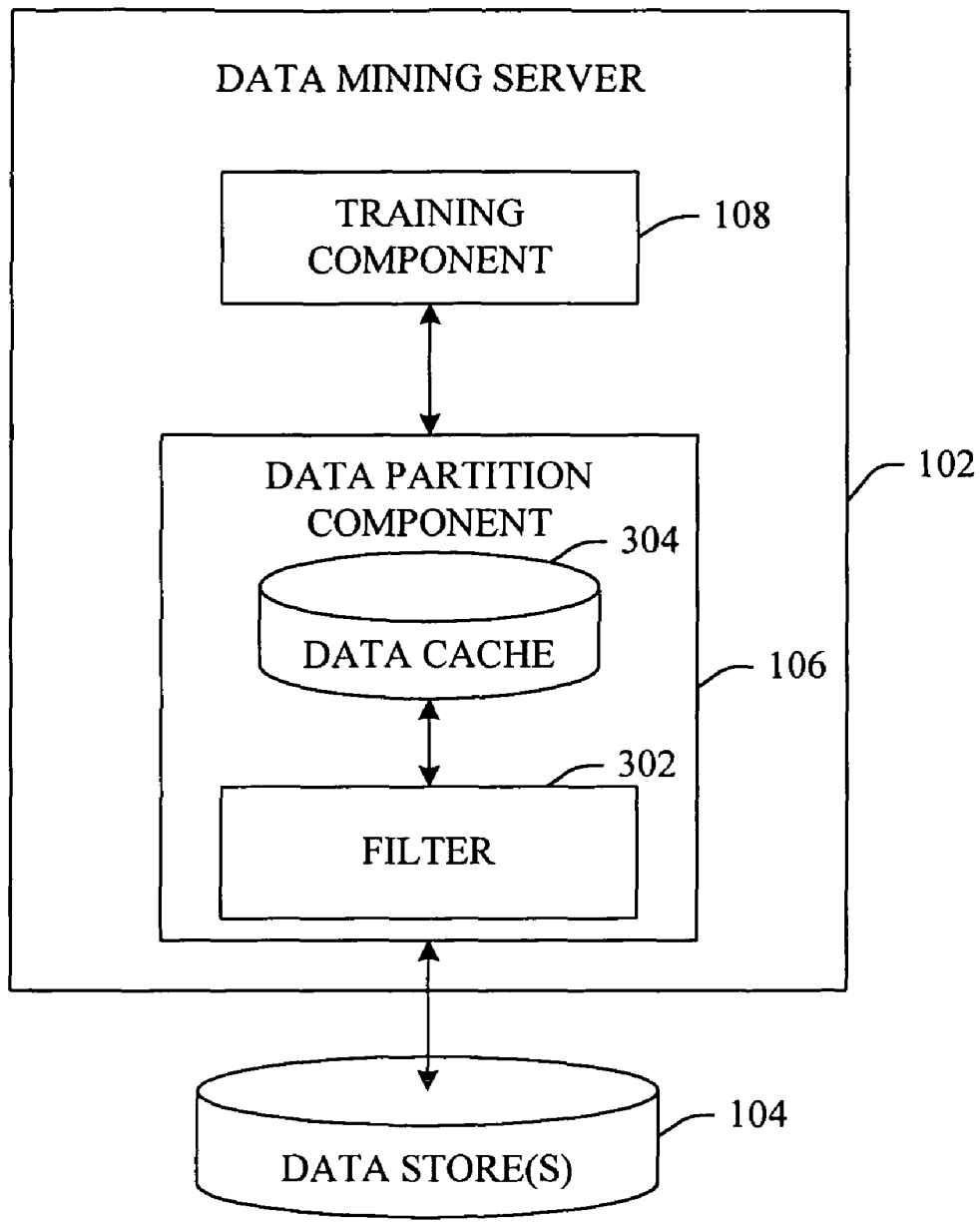
FIG. 3 illustrates a system that employs a data cache and a filter to locally partition data in accordance with an aspect of the innovation.

Turning now to FIG. 3, an alternative block diagram of system 100 is shown in accordance with an aspect of the innovation. More particularly, FIG. 3 illustrates that data partition component 106 can include a filter component 302 and a local data cache 304. As will be described in greater detail infra, the system 100 can include any type of filter, or groups of filters, that can be employed to partition the data maintained within the local data cache 304.

As described above, the data structure or data cache 304 can employ any cache mechanism in disparate aspects of the innovation. While the concept of a mining structure as a data cache 304 can be very efficient, it will be appreciated and understood that the filter component 302 can be employed to effect manipulations of only partitions of the data cache 304 in certain operations. For instance, some of the most common scenarios are splitting the data in the data cache 304 into train/test sets (e.g., Boolean, fixed percentage) and 10-fold cross validation.

By way of further example, oftentimes a statistician or analyst may want to use only part of the data in training a mining model. As such, the filter component 302 can be employed to query and split the data in the local cache 304 as desired. In another example, the user may want to perform an N-fold cross validation upon the data. In yet another aspect, the user may want to visualize the training set or check accuracy over a test set in the same structure. Each of these exemplary scenarios will be described in greater detail with respect to the figures that follow.

Figure 4:
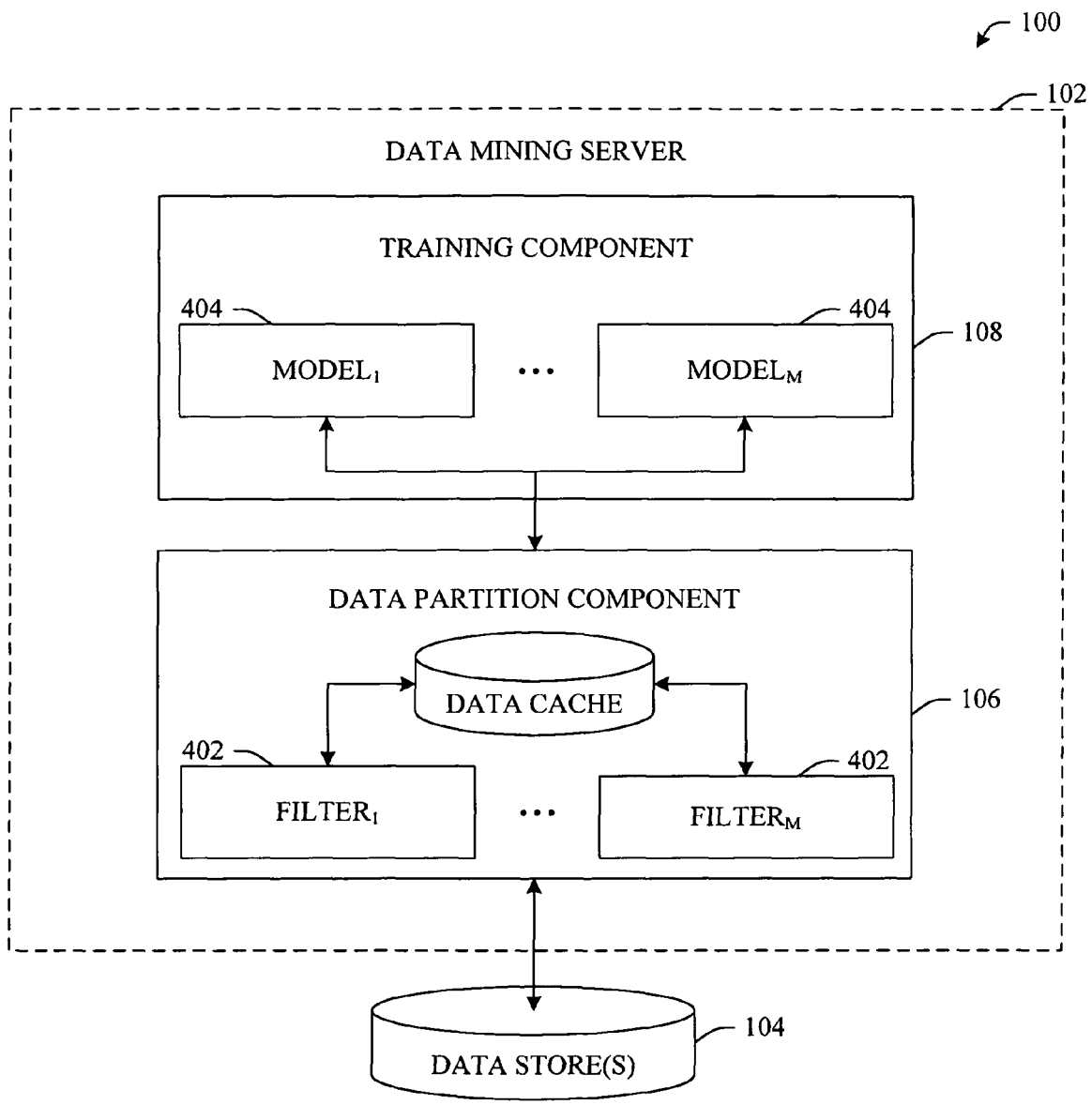
FIG. 4 illustrates a system that includes multiple filter components and corresponding model components in accordance with an aspect of the innovation.

FIG. 4 illustrates an alternative block diagram of system 100 in accordance with a disparate aspect. As shown, data partition component 106 can include 1 to M filter components, where M is an integer. It is to be understood an appreciated that 1 to M filter components can be referred to individually or collectively as filter components 402.

Similarly, training component 108 can be employed to train 1 to M models 404 that correspond to the filter components 402. Following is a discussion of three specific filtering (e.g., partitioning) schemes. While specific examples are described below, it is to be understood that these specific partitioning schemes are included to provide perspective of the innovation and are not intended to limit the innovation in any way. To this end, it will be understood that other partitioning schemes can be employed and are to be included within the scope of this disclosure and claims appended hereto.

Figure 5:
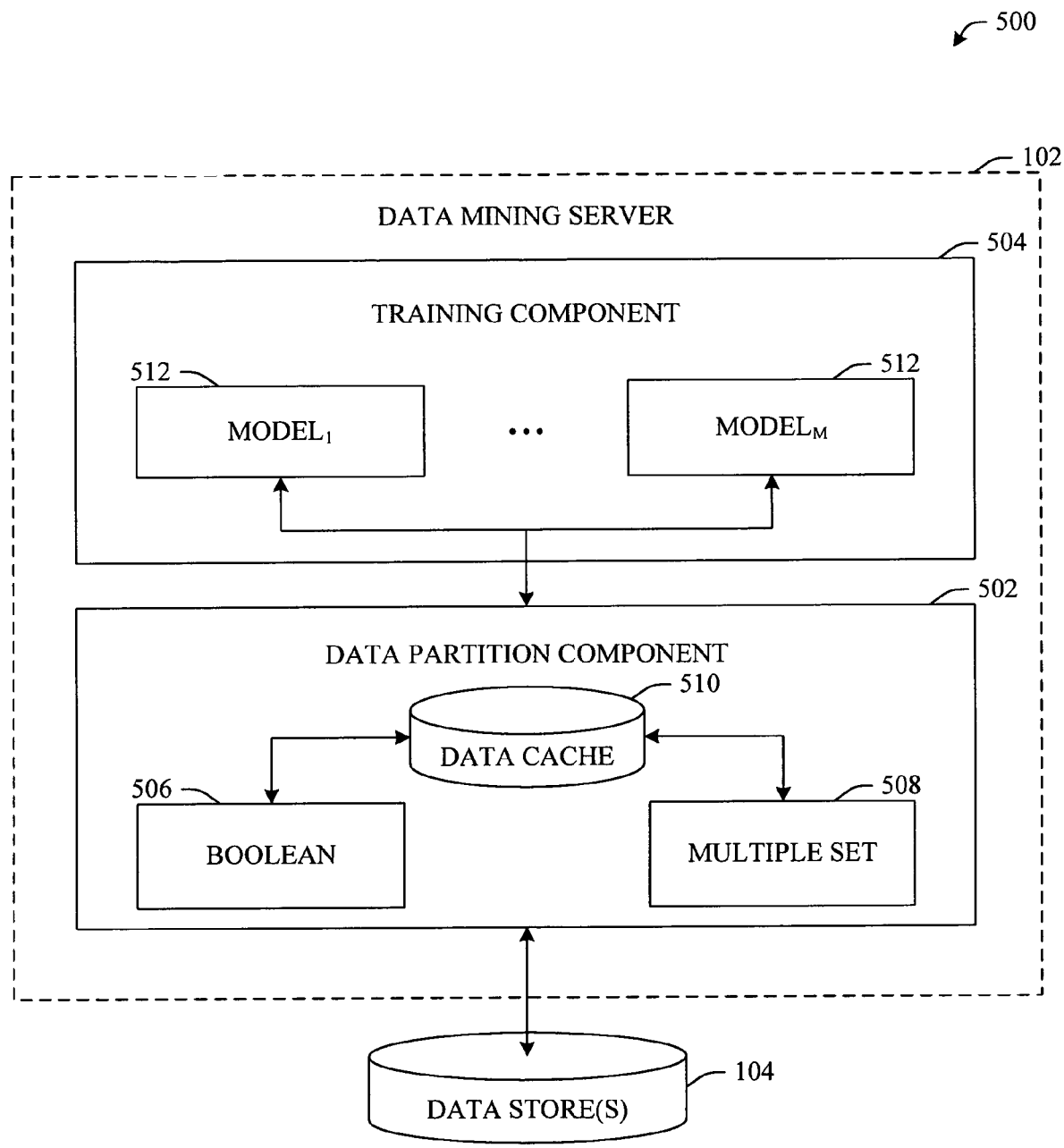
FIG. 5 illustrates an exemplary architecture including a Boolean filter and a multiple set filter in accordance with an aspect of the innovation.

Referring now to FIG. 5, a specific data mining system 500 is shown. As shown, the data mining server 102 (e.g., engine) can include a data partition component 502 and a training component 504. The data partition component 502 can include a Boolean filter 506, a multiple set filter 508 and a data cache 510. As stated earlier, although specific filtering or partitioning components are shown integral to the data partition component 502, other partitioning mechanisms can be employed in accordance with alternative aspects of the innovation. As well, partitioning mechanisms can be combined as desired. Still further, UDFs can be employed in accordance with aspects of the innovation to filter and/or partition data in the data cache.

In one aspect, the data is fetched from the relational data server or store 104 and cached on a mining services server (e.g., data cache 510). Accordingly, the data can be analyzed in multiple ways on the mining services server (e.g., data mining server 102) by utilizing a desired data mining algorithm. It will be understood and appreciated that conventional data mining systems query during the processing and detecting patterns. In other words, the data is not locally maintained (e.g., cached) but rather queried during the mining operation and afterwards, the data is discarded.

In addition to locally maintaining the data, the subject system 500 can partition the data in an effort to more efficiently detect patterns. Thus, the system 500 can employ the novel functionality of defining the partitions for the data that is being mined.

In accordance therewith, this novel partitioning can be employed to model a subset of the data. Essentially, as described herein, aspects of the subject innovation can address three exemplary scenarios; mining only data points in a training set that satisfy certain Boolean conditions, splitting the data into multiple partitions and N-fold cross validation scenarios. It is to be appreciated that, although three specific scenarios are described herein, other scenarios of partitioning can exist in accordance with other aspects of the innovation. These additional scenarios are to be included within the scope of this disclosure and claims appended hereto. For example, disparate mechanisms of cross validation and partitioning can be employed without departing from the overall novel functionality of the innovation.

By way of more specific example, a disparate and additional scenario can partition the data with respect to a particular criterion (e.g., month). As such, the training component 504 can only train with a subset of this partition (e.g., last three months of the data). In this example, it will be understood that the user can compare with models that were trained on the previous three months of data and so on. This can be viewed as a "moving window."

A discussion of the following scenario and exemplary data is provided to add context to the innovation. As such, this scenario is not intended to limit the scope of the innovation in any way. Rather, the scenario is provided to add perspective with respect to the novel features, of the innovation. It is to be understood that there are an unlimited number of scenarios, each of which are to be included within the scope of this disclosure and claims appended hereto.

With reference again to FIG. 5, in accordance with the following scenario, the data set considered is a database (e.g., data store 104) that maintains information concerning high school students. For example, the database 104 includes information such as, gender, IQ, family income, an indicator as to whether the parents are encouraging the student to go to college or not, etc. In this example, a goal is to attempt to determine or predict whether a student goes to college or not based upon gathered information in the database 104. By way of more particular example, it is a goal to detect a pattern such as, if the student is smarter than average and the parents are encouraging the student to attend college then the student will go to college.

Referring to a first partitioning mechanism 506, the first scenario is directed to training a mining model for only those rows that satisfy a certain Boolean condition. For example, the user may choose to produce a model 512 to identify what determines whether a student goes to college when the parents are not encouraging college. As stated supra, this encouragement identifier is one of the data points maintained within the data cache 510. As such, the Boolean filter 506 can be configured to filter out rows in the relational table for which the parents have encouraged college to a child.

In another example, a more complex set of filters can be employed. For example, a filter can be configured that establishes what determines going or not going to college for students who are not encouraged by their parents and who are members of a family having lower than a specified income level. In other words, it will be appreciated that these Boolean conditions can be combined in any way to further narrow a data set.

In another example, the system can employ a multiple set filter 508 that randomly chooses a fixed percentage, e.g., 70%, of all of the students. Accordingly, a data mining model 512 can be built based upon this defined set. Furthermore, in this example, the system 500 can validate this mining model 512 against the other 30% of the students to determine how well the first model 512 predicts against the other remaining the students. As such, the system 500 can compare the partitioned results with actual historic results in accordance with the verification process.

This way we can measure the accuracy of the mining model. In this case, the partition is a percentage rather than a Boolean condition. In other words, there is one random partition, e.g., 70% and a second partition that includes everything else, e.g., remaining 30%. It will be appreciated that this example only considers two disparate partitions.

In another example, the system can consider any number of partitions as well as any number of partitions in addition to Boolean conditions. By way of further example, the percentage split can be employed after the Boolean condition is applied. All in all, any combination or scheme of partitioning can be employed in alternative aspects. These alternative aspects are to be included within the scope of the innovation and claims appended hereto.

Figure 6:
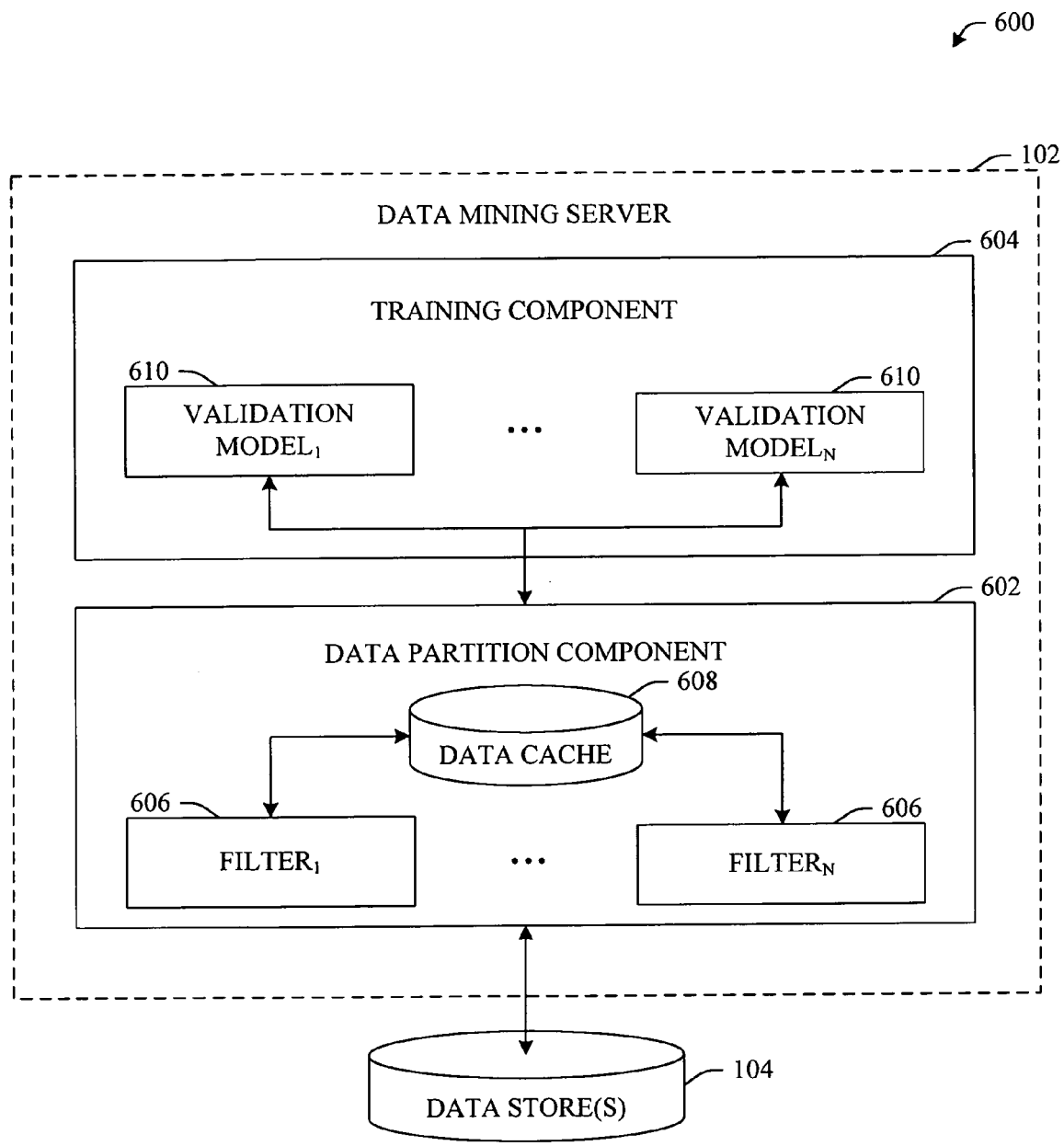
FIG. 6 illustrates an N-fold cross validation system in accordance with an aspect of the innovation.

Turning now to a third scenario illustrated in FIG. 6, an alternative system 600 that facilitates partitioning data within a data mining server 102 is shown. More particularly, the system 600 illustrated in FIG. 6 is directed to an N-fold cross-validation scheme having a data partition component 602 and a training component 604. As shown, the data partition component can include 1 to N cross validation filter components 606, where N is an integer, and a data cache 608. In accordance therewith, the training component 604 can include 1 to N validation models 610 that correspond to each of the 1 to N filter components 606. In operation, the result of the N-validation operation is a single model that can be used for predictions in accordance with the data mining operation. More particularly, the single model can be the best model of the 1 to N validation models 610.

Referring again to the aforementioned example, the system 600 can be applied to a situation where a user is attempting to determine an optimum set of rules that describe what makes a student decide to go to college or not. In this specific N-fold cross validation system 600, all of the data maintained within the data cache 608 can be employed to train models.

First, the user can consider a random set from the data cache 608, e.g., 90% of the students, view the model 610 and detect a set of rules. Next, this model 610 can be validated against the whole set 608 to determine the accuracy of the model 610. For instance, the system 600 can have good predictions for 60% of the students. Next, the system 600 can select a different 90%, view the new model 610 and determine the accuracy of the new model 610. Here, a different number for accuracy can be obtained, for example, 51%. This can be performed N times and the model having the best accuracy can be chosen.

Here, the partition that is defined by the N-fold cross validation are not persisted but, rather generated at runtime during training to find out about a model. As well, this N-fold cross validation can be applied on top of any of the previously mentioned partitions (e.g., Boolean or percentage partitions). In other aspects, the novel innovation can apply partitions to a data set, build models and average the results from each of these models. It will be appreciated that averaging these models can oftentimes achieve a more consistent result.

In operation, these conditions can be defined in a metadata definition language. In one aspect and on the server, in terms of data mining, there can be two kinds of objects, a structure and a model. One main object can be defined as a mining structure which is basically a data cache (e.g., 608 of FIG. 6). The mining structure does not detect patterns by itself but rather the mining models perform analysis upon data within the mining structure. To this end, the mining model can arrive with mining rules and patterns with respect to the data within the cache.

Therefore, at the mining structure object level, the innovation does not perform N-fold cross validation because it is pretty much a static object. However, the other two methods of partitioning (e.g., Boolean and percentage) can be performed at the mining structure level. At the mining model level, all three exemplary partition schemes can be applied. For example, the mining model can be used upon only those rows of the mining structure that satisfy a certain Boolean condition. As well, the mining model can be used upon a fixed percentage of the mining structure. Finally, the mining model can be used for N-fold cross validation.

In operation, in defining a Boolean condition, a language in the metadata definition that defines the Boolean condition can be employed. For example, the data mining extension (DMX) can be expanded to accommodate the novel functionality described herein. It will be understood that this exemplary DMX language enables a user to perform queries over data mining models.

In accordance with an aspect of this innovation, this DMX language can be employed to define filters. For example, a filter can be a Boolean condition such as "income>30,000". In this case, income will be one of the columns of the data that is cached from the relational data and 30,000 is one of the values interpreted by that column. It will be appreciated that the filter can be any operator that can be used in connection with the type of data in any column of the relational data.

More particularly, in a numerical example, operators can include >, <, =, etc. Similarly, in the instance of "Parents encourage college?" the operator could be "equal to 'encourage'" or "not equal to 'encourage'". Thus, in a Boolean filter aspect, the type of available operators will depend upon the type of data in the columns. Basically, the DMX filter can be as complex as necessary for example; the filter may involve more that one column, more than one operator, more than one variable, etc.

In additional to DMX fragments, as described above, users can employ their own user defined functions (UDFs). For example, a user can generate a stored procedure that can facilitate a filter upon cached data. It will be appreciated that the use of UDFs can particularly increase the extensibility and personalization of a data mining system.

As described supra, it will be understood that in accordance with conventional systems, any filtering of data is performed externally from the data mining server. In other words, the filtering can only be effected by defining a query upon the relational engine. In these traditional systems, once the data is fetched for modeling, it has already filtered and cannot be partitioned or re-partitioned inside the data mining server. Rather, additional data would have to be fetched in the event additional modeling or validation is desired.

Referring again to the example for determining rules that can be applied to determine whether or not a child would decide to go to college if the student's family is not particularly wealthy, the subject innovation can effectuate fetching all of the data into a mining services server and then define desired partitions upon the fetched (e.g., locally cached) data. Accordingly, upon the same mining structure (e.g., cache) that has been partitioned, the novel innovation can build mining models for each partition.

In conventional systems, it was not possible to fetch all data from a relational database and thereafter locally apply a desired partitioning scheme. In other words, conventional systems could only perform modeling on pre-filtered data. Thus, the user would build the mining model within the data mining server or engine and then push the filtering to the relational engine rather than effecting the portioning locally within the data mining server or engine.

It will be understood that it is not always easy to write custom UDFs inside the relational server. For example, if the relational source is a text file, there is no way to filter in a conventional system. Rather, the subject innovation can fetch all of the amorphous data into the novel server or tool and can locally facilitate employing a stored procedure to filter the data row by row.

In a second scenario, the user can define the size of the partitions. For example, the defined partition can be a number of cases or a percentage of the total. Further, the filter can include names for each partition or the system can employ default names, for example, "test" and "validation" partitions. However, in accordance with the novel features of the innovation, the user can define any name as desired. As such, the system can query by name within the mining structure (e.g., data cache) thereafter partitioning the data within the cache.

With reference to the N-fold cross validation scenario, here, the mining model can be built on any of the partitions from described above, e.g., either a partition defined by a filter or a partition defined by sampling. As will be understood, the N-fold cross validation is applied to the mining model and not the mining structure. In accordance therewith, the filter for the mining model will contain the number of folds in the N-fold cross validation. For example, suppose a 10-fold validation, the number of folds is 10. To this end, the size of the data structure will be used to determine the number of cases in each of the partitions.

In accordance with the N-fold cross validation, the actual partitions defined in the procedure are not visible after training. In other words, these partitions are generated "on-the-fly" during training. In operation, the system can either choose the best model using these partitions or keep them as separate models for use in another procedure (e.g., averaging). It is to be understood that a mining model can perform N-fold cross validation over a given partition of the mining structure. This given partition can be established using any user defined mechanism (e.g., Boolean, percentage).

Figure 7:
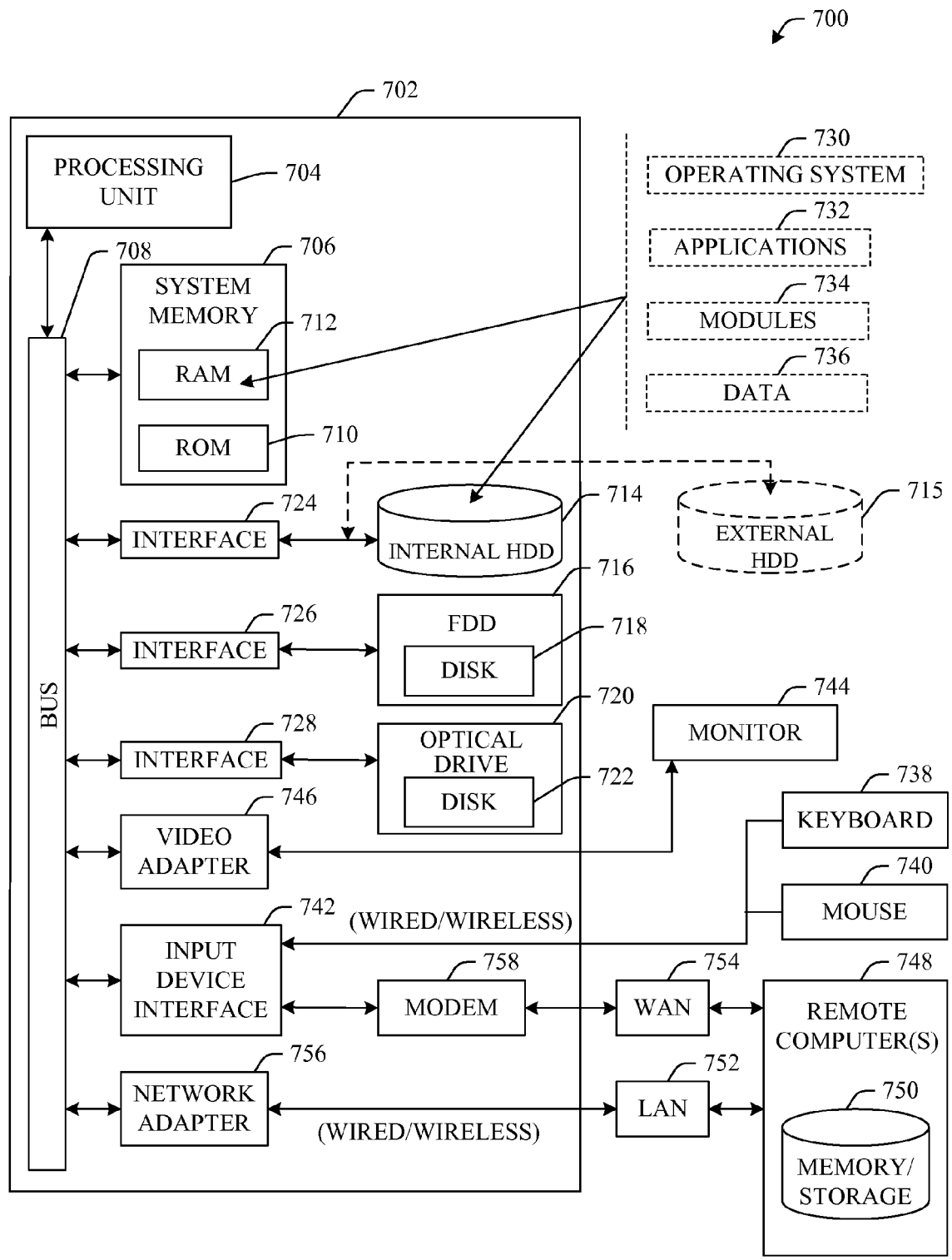
FIG. 7 illustrates a block diagram of a computer operable to execute the disclosed architecture.

FIG. 7 illustrates a system 700 that employs an artificial intelligence (AI) component 702 which facilitates automating one or more features in accordance with the subject innovation. The subject innovation (e.g., automatically determining the appropriate partition size, automatically partitioning data into an old partition) can employ various AI-based schemes for carrying out various aspects thereof. For example, AI can be employed in a process for automatically determining the appropriate partition size for validation and/or training based upon data complexity. In another aspect, as data ages, the system can employ an automatic classifier system and process to automatically partition out the aged data into an old partition.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes can be categories or complexity of data (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria a partition size or filter criterion.

Referring now to FIG. 7, there is illustrated a block diagram of a computer operable to execute the disclosed architecture of local partitioning with respect to a data mining operation. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use (e.g., as an external hard disk drive 715) in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714-715, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11 lb) data rate, for example, or with products that contain both bands (dual band), so the networks can provide real-world performance similar to the basic 10BaseT wired Ethernet networks used in many offices.

Figure 8:
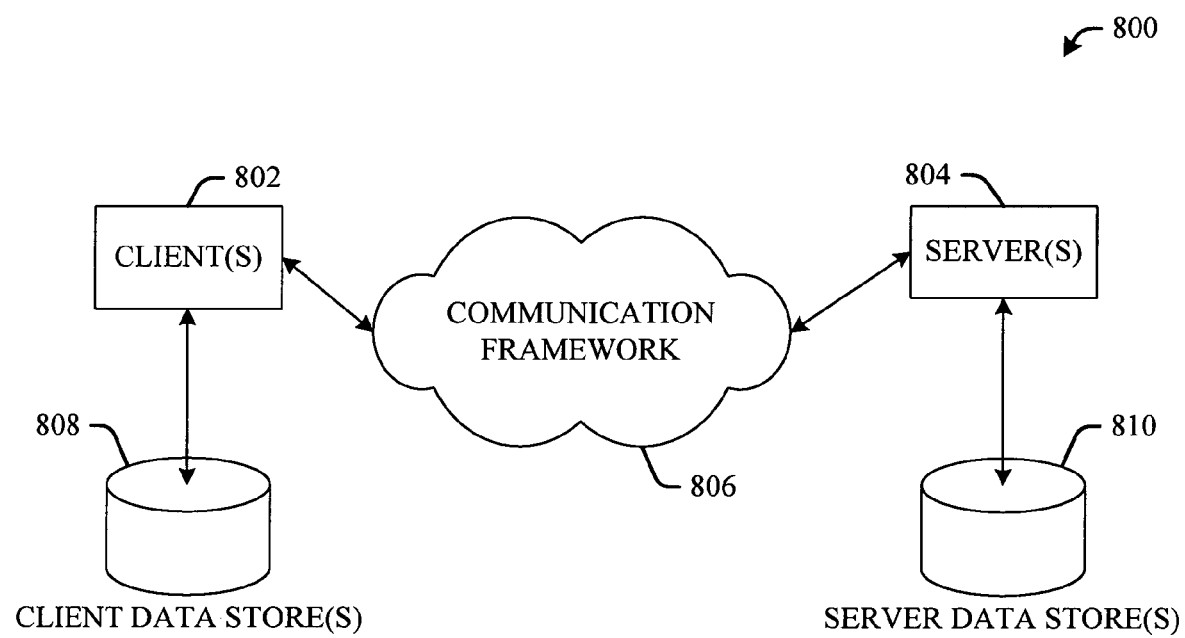
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data mining server that includes a computer-readable storage medium configured to facilitate partitioning a locally maintained training data set for a data mining operation, comprising:

a data partition component configured to fetch the training data set from a remote relational data server, allocate a subset of the locally maintained training data set to yield a training partition of the locally maintained training data set at runtime during training of a data mining model and allocate at least a portion of the remainder of the locally maintained training data set to yield a first testing partition of the locally maintained training data set at runtime during training of the data mining model, the data partition component further configured to allocate at least a portion of the locally maintained training data set to yield a second testing partition at runtime during training of the data mining model, the second testing partition of the locally maintained training data set including at least a portion of the training partition and at least a portion of the first testing partition; and a training component configured to train the data mining model based at least in part upon the subset of the locally maintained training data set corresponding to the training partition and validates the data mining model based at least in part upon the first testing partition of the locally maintained training data set and at least in part upon the second testing partition of the locally maintained training data set;

wherein the data partition component comprises:

a data cache that locally caches the locally maintained training data set; and a filter component that filters the locally cached data set based upon a Boolean condition specified in a data mining extension (DMX) language and further filters the locally cached data set based upon a user defined function (UDF) comprising a stored procedure; and wherein the data partition component to allocate the subset of the locally maintained training data set and allocate the at least a portion of the remainder of the locally maintained training data set, applies a user-defined proportion to the Boolean-condition-and-stored-procedure-filtered, locally cached data set.

2. The data mining server of claim 1, further comprising an artificial intelligence (AI) component that employs a statistical-based analysis that infers an action that a user desires to be automatically performed.

3. At a computer system including one or more processors and system memory, a method facilitates data mining, the method comprising:

fetching data from a remote relational server;

filtering the fetched data based upon a Boolean condition specified in a data mining extension (DMX) language and based upon a user defined function (UDF) comprising a stored procedure;

locally partitioning the Boolean-condition-and-stored-procedure-filtered data into a first subset of the Boolean-condition-and-stored-procedure-filtered data and a first remainder of the Boolean-condition-and-stored-procedure-filtered data at runtime during training of a mining model;

building the mining model that detects a data pattern based at least in part upon the first subset of the data;

locally allocating a second subset of the data, the second subset including at least a portion of the first subset of the data and at least a portion of the first remainder of the data; and validating the mining model based at least in part upon at least a portion of the first remainder of the data and at least in part upon the second subset of the data.

4. The method of claim 3, comprising:

applying the mining model to the first subset of the data; and detecting the data pattern.

5. The method of claim 3, further comprising applying an N-fold cross validation to the mining model.

6. At a computer system including one or more processors and system memory, a method that facilitates data mining, the method comprising:

fetching a data set from a remote relational data store;

locally caching the data set;

filtering the locally cached data set based upon a Boolean condition specified in a data mining extension (DMX) language and a user defined function (UDF) comprising a stored procedure to yield a filtered subset of the data set;

using a user-defined proportion to partitioning the Boolean-condition-and-stored-procedure-filtered subset of the data set into at least three partitions including:

a first training partition of the filtered subset of the data set;

a testing partition of the filtered subset of the data set; and a second training partition of the filtered subset of the data set, the second training partition including at least a portion of the first training partition and at least a portion of the testing partition;

generating the training partition and the first and second testing partitions at runtime during training of a mining model;

building the mining model that detects a data trend within the training partition of the filtered subset of the data set;

validating the mining model based at least in part upon the first training partition and the second training partition; and generating a prediction based upon the mining model as validated.

* * * * *